(No Model.)
C. D. HASKINS.
QUADRUPLEX TELEGRAPHY.
No. 405,211. Patented June 11, 1889.
Fig.1.
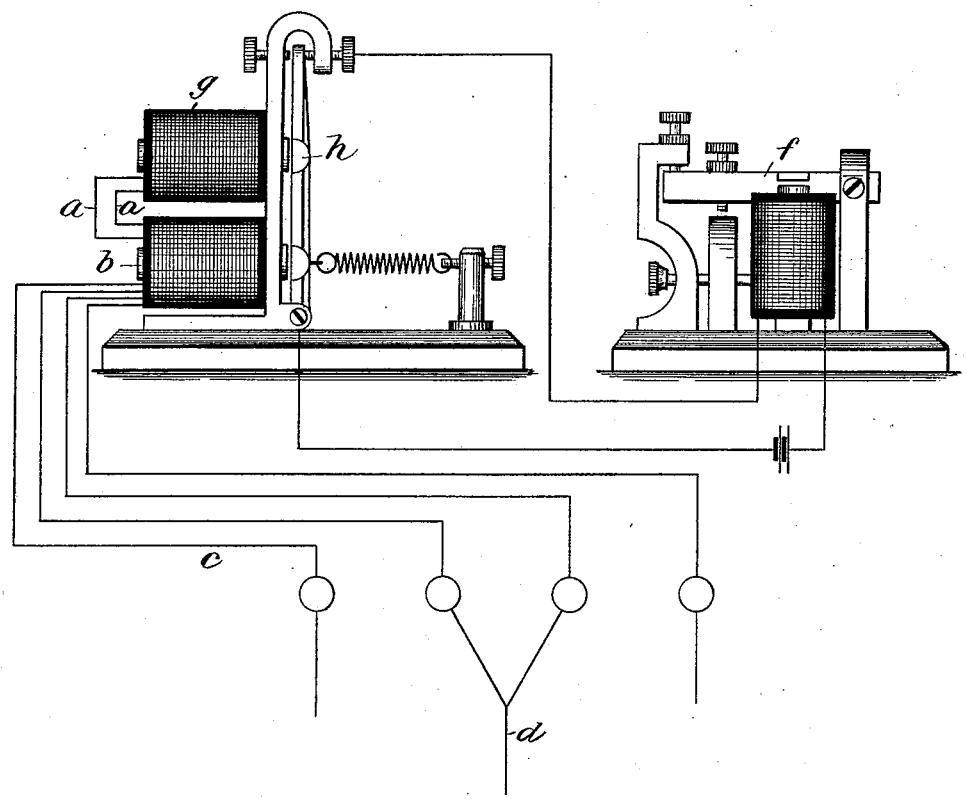
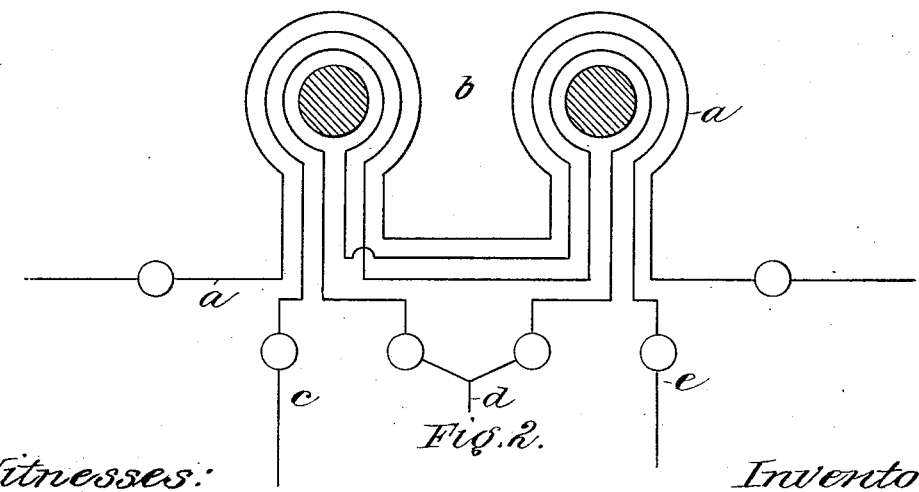
Fig.2.
Witnesses:
Sam'l B. Dover.
Chas. G. Hawley.
Inventor.
Charles D. Haskins.
By George P. Barton
attorney

UNITED STATES PATENT OFFICE.

CHARLES D. HASKINS, OF BROOKLYN, NEW YORK, ASSIGNOR TO THE WESTERN ELECTRIC COMPANY, OF CHICAGO, ILLINOIS.

QUADRUPLEX TELEGRAPHY.

SPECIFICATION forming part of Letters Patent No. 405,211, dated June 11, 1889.

Application filed November 19, 1887. Serial No. 255,602. (No model.)

*To all whom it may concern:*

Be it known that I, CHARLES DARWIN HASKINS, a citizen of the United States, residing at Brooklyn, in the county of Kings and State of New York, have invented a certain new and useful Improvement in Quadruplex Telegraphy, (Case 2,) of which the following is a full, clear, concise, and exact description, reference being had to the accompanying drawings, forming a part of this specification.

In the working of quadruplex systems of telegraphy a false signal has been caused at the neutral relay when the polarity of its current is changed by the double-current transmitter at the distant end during the time that the armature of said neutral relay should be held up by the operation of the single-current transmitter. This false signal has been heretofore prevented by various devices especially devised for this purpose, as is shown, for example, in patent to Moffatt & Blakeney, No. 351,933, of November 2, 1886, for quadruplex telegraphy, and Jones, No. 360,528, of April 5, 1887, for quadruplex telegraphy.

My invention relates to devices for preventing such false signals; and it consists in providing an extra electro-magnetic device to the neutral relay in circuit with an extra helix provided on the neutral-relay magnets. The current induced in the extra coil or helix serves to energize the extra electro-magnet, so that the armature-lever of the neutral relay, instead of falling away or kicking, as it has done heretofore, is held in position by the extra electro-magnet and armature.

In the drawings, which are illustrative of my invention, Figure 1 is a diagram illustrative of a neutral relay provided with my improvements connected with the local sounder in a quadruplex-telegraph system. Fig. 2 is a diagram illustrative of the manner in which I preferably wind the magnets of the neutral relay.

As shown in Fig. 2, $a$ is the extra coil wound upon the neutral-relay magnet $b$. The line $c$ is connected, as shown, through the different spools of magnet $b$, to the wire $d$, leading to the transmitter. The wire $e$ from the rheostat is connected in like manner through a coil of each of the relay-magnets, and from thence with the wire $d$, leading to the transmitter.

The particular method of winding the spools of the neutral relay with concentric coils I have claimed in a separate application filed herewith.

Referring to Fig. 1, it will be seen that the sounder $f$ is included in the local circuit of the relay in the usual manner.

My invention consists in providing the extra electro-magnet $g$ upon the neutral relay, said magnet being placed in the circuit of the extra coil or helix $a$ and arranged to hold the armature $h$ from falling back or kicking when energized by current induced in the extra coil $a$. By this arrangement false signals upon the relay $g$ are prevented.

Having thus described my invention, I claim as new and desire to secure by Letters Patent—

In a neutral relay, the combination, with the differentially-wound electro-magnet, of an extra coil upon said electro-magnet and an extra electro-magnet included in circuit with said extra coil, said differentially-wound electro-magnet and said extra electro-magnet each being provided with a separate armature and said armatures being mounted upon the same lever, whereby currents induced in the extra coil energize the electro-magnet included in its circuit to prevent the armature of the said relay from falling away or kicking.

In witness whereof I hereunto subscribe my name this 5th day of October, A. D. 1887.

CHARLES D. HASKINS. [L. S.]

Witnesses:
JOHN J. CARTY,
MILLS H. LANDON.